Patented Nov. 14, 1922.

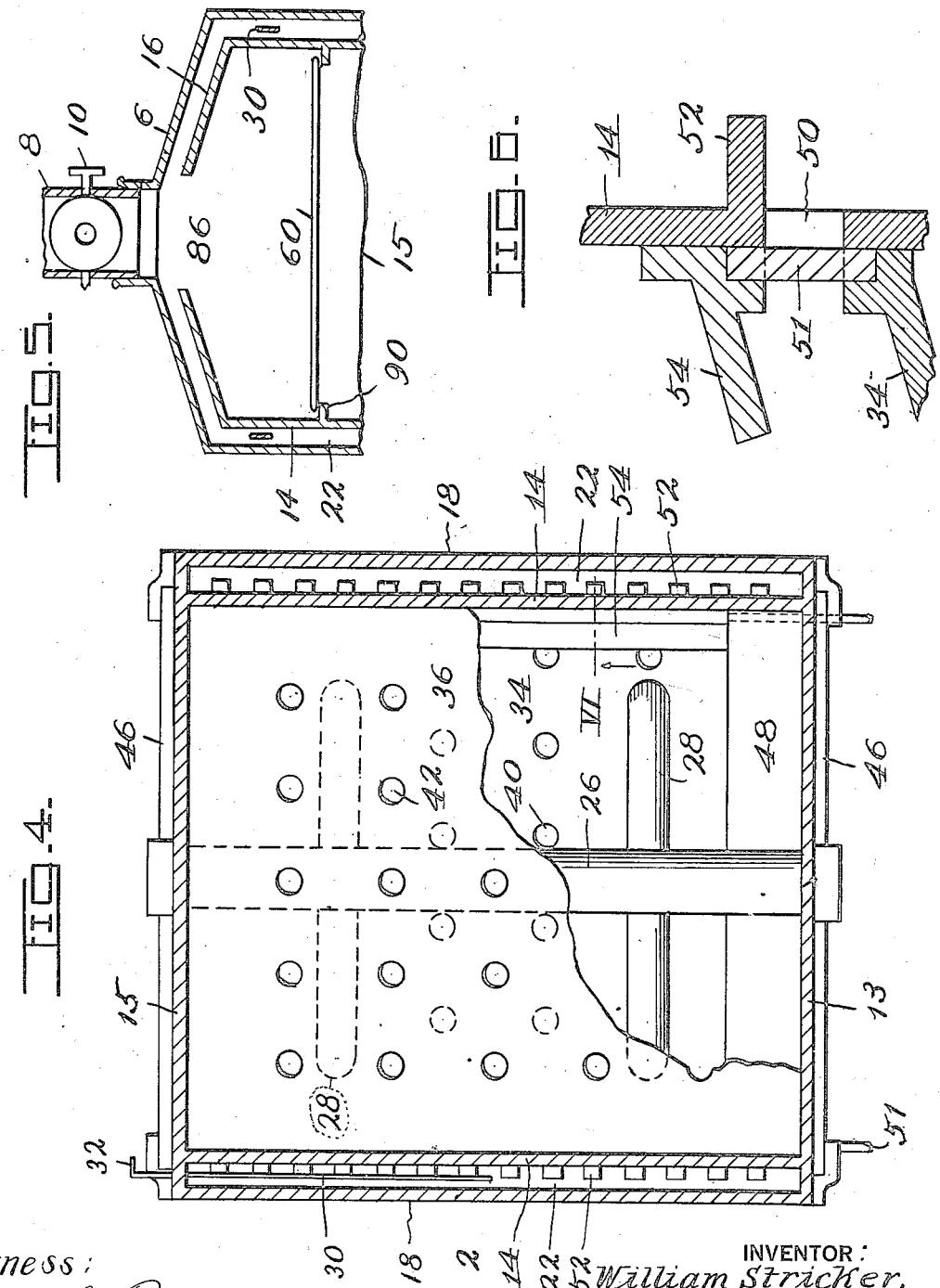

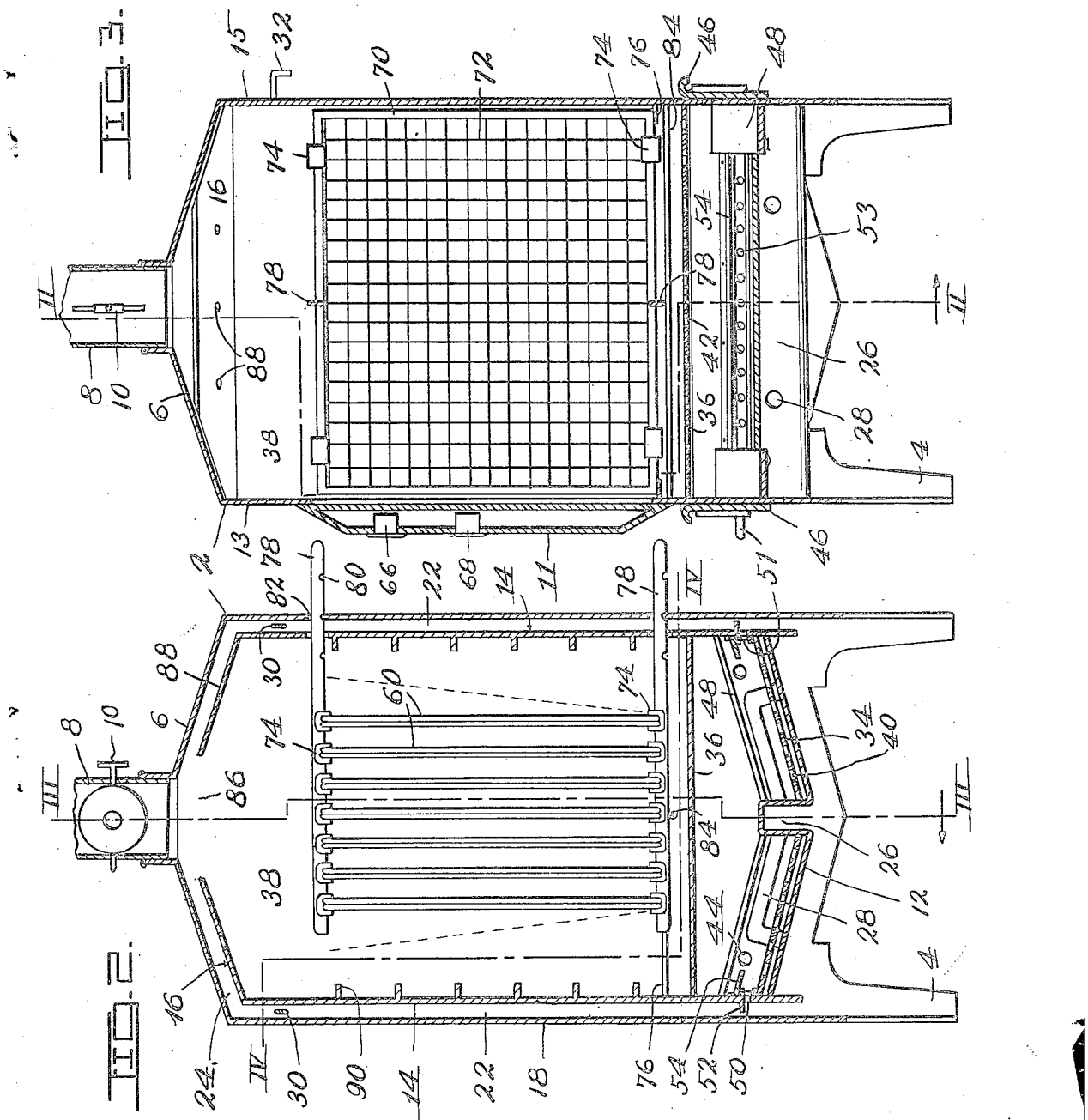

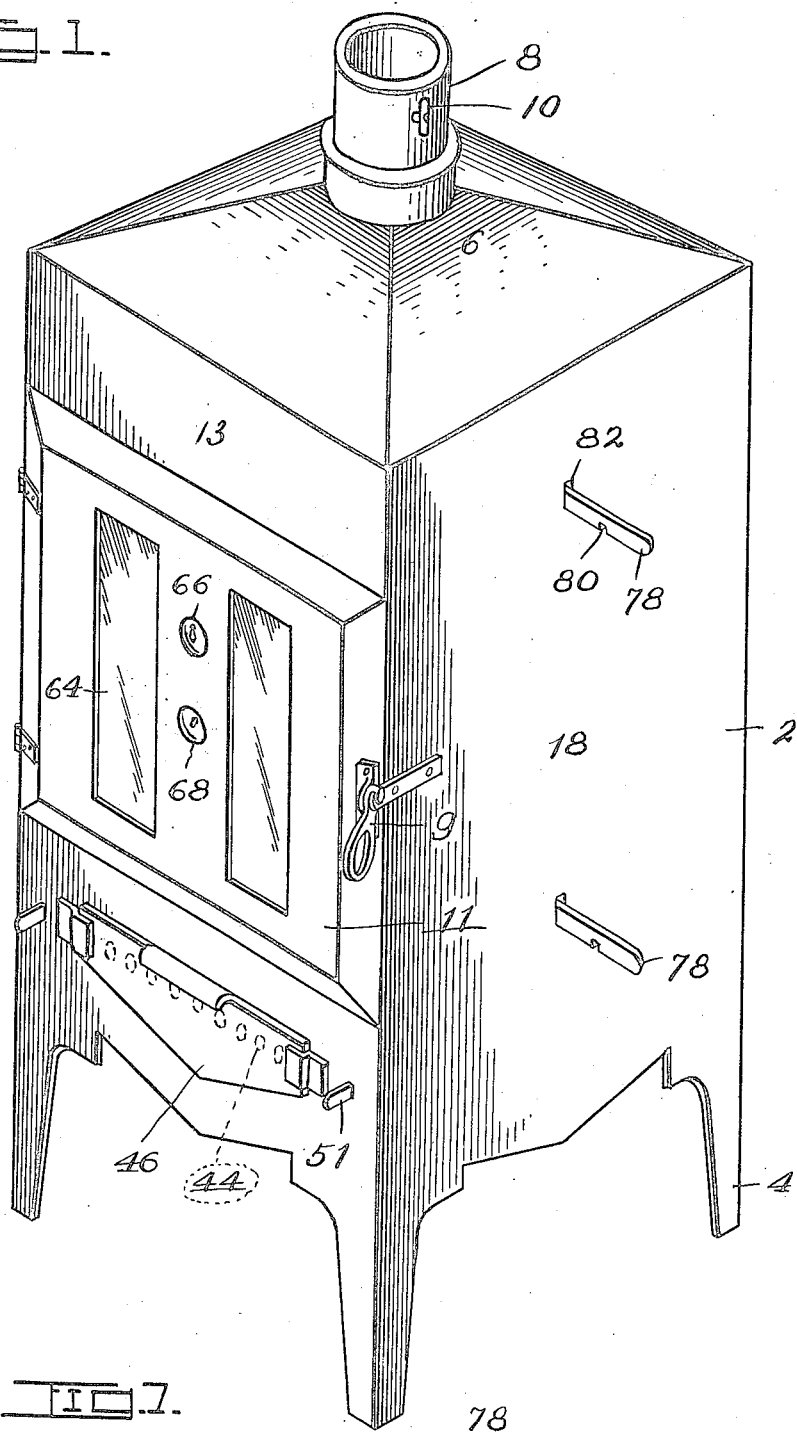

BEST AVAILABLE COPY 1,435,755

UNITED STATES PATENT OFFICE.

WILLIAM STRICKER, OF KANSAS CITY, MISSOURI, ASSIGNOR, BY MESNE ASSIGNMENTS, TO PERFECTION DEHYDRATOR COMPANY, A CORPORATION OF DELAWARE.

DEHYDRATING APPARATUS.

Application filed July 27, 1921. Serial No. 487,848.

*To all whom it may concern:*

Be it known that I, WILLIAM STRICKER, a citizen of the United States, residing at Kansas City, in the county of Jackson and State of Missouri, have invented certain new and useful Improvements in Dehydrating Apparatus, of which the following is a specification.

My invention relates to dehydrating apparatus in which fruit, vegetables or the like can be quickly dried without removing the natural flavor therefrom, and one object is to provide an apparatus of this character with means whereby the products of combustion and the fresh air circulating through the apparatus may be controlled at will, to the end that the best results may be had with an economical consumption of fuel.

A further object is to provide an apparatus in which the moisture arising from the fruit and vegetables being dried is quickly exhausted from said apparatus, so that it can not return to and permeate such fruit and vegetables.

Heretofore, it has been customary to place the produce to be dried in horizontal trays disposed one above the other in such manner as to cause the hot air to pursue a tortuous course. This arrangement is more or less unsatisfactory as the underside of the produce is subjected to a higher temperature than the upper side, thus causing the latter to dry more slowly than the former. The tortuous course of the air also results in more or less moisture being deposited upon the produce, thus materially retarding the evaporating process and increasing the consumption of fuel.

One important feature of my invention resides in arranging the trays in vertical position, thereby exposing all sides of the produce to a uniform temperature and in effect providing a series of flues for the rapid passage of the heated air, so that it will not be retarded and deposit the moisture with which it is laden upon the contents of the trays.

Other features will hereinafter appear, and in order that the invention may be fully understood, reference will now be had to the accompanying drawings, in which:—

Fig. 1 is a perspective view of the apparatus.

Fig. 2 is an irregular vertical section taken on line II—II of Fig. 3.

Fig. 3 is an irregular vertical section on line III—III of Fig. 2.

Fig. 4 is an enlarged irregular horizontal section on line IV—IV of Fig. 2.

Fig. 5 is a fragmentary vertical section of the upper portion of the apparatus showing one of the trays arranged in horizontal position.

Fig. 6 is an enlarged fragmentary vertical cross section on line VI of Fig. 4.

Fig. 7 is a side elevation of a bar for adjusting the vertically disposed trays to inclined positions.

Referring now in detail to the various parts, 2 designates a vertical container, preferably, of rectangular form and provided at its lower end with legs 4 and at its upper end with a pyramidial top 6 having a centrally disposed exhaust stack 8 provided with a damper 10, for regulating the exhaust of products of combustion and the heated fresh air. The legs 4 elevate the bottom 12 of the container 2 above the floor, so that a lamp or other heater, not shown, may be placed beneath said bottom 12. Access is had to the interior of the container through a front door 11, provided with a fastening device 9 for securing it in closed position.

The container 2 is provided with partition walls 14 and 16 spaced a slight distance from the two side walls 18 and the two adjacent top walls 6 to form interior flues 22 and 24, respectively, for carrying off the products of combustion. The partition walls 14 and 16 extend from the front to the rear walls 13 and 15, respectively, of the container 2, while the partitions 14 extend below the bottom 12 to prevent the products of combustion from entering the flues before thoroughly heating the entire bottom 12. Further distribution of the products of combustion is had by providing the bottom 12 with a duct 26 extending from the front wall 13 to the rear wall 15 of the container 2 and communicating with branch ducts 28, which conduct the products of combustion into the lower portion of the container and thence to the outer atmosphere. The passage of the products of combustion through the flues 22 is controlled by dampers 30 mounted in the front and rear walls 13 and 15, respectively, and provided at their rear ends with handles 32, whereby they may be rotated to open or closed position.

34 and 36 designate two baffle plates within the lower portion of the container 2, the baffle plate 34 being spaced a short distance above the main bottom 12, while the baffle plate 36 is disposed some little distance above the baffle plate 34, Figs. 2 and 3. These baffle plates 34 and 36 cover the lower portion of the dehydrator chamber 38 formed by the main bottom 12, the front and rear walls 13 and 15, respectively, and the partition walls 14 and 16. The baffle plates 34 and 36 have alternately disposed perforations 40 and 42, respectively, through which fresh hot air is distributed uniformly throughout the chamber 38 instead of being permitted to follow the partition walls 14 as would likely be the case if such distributing means were not provided.

Fresh air to be heated is admitted to the lower portion of the chamber 38 just above the baffle plate 34, through inlet ports 44 extending through the front and rear walls 13 and 15, respectively, of the container 2, the admission of air being controlled by slidable dampers 46. As the cool air enters through the ports 44 it is directed toward the center of the chamber 38, in order to be more uniformly distributed by deflectors 48 secured to the front and rear walls 13 and 15, respectively, at points between the baffle plates 34 and 36.

A portion of the heated air passing upwardly through the flues 22 may be admitted directly to the lower portion of the chamber 38 when desired, through ports 50 in the partitions 14, which latter have deflectors 52 immediately over said ports 50 to direct the heated air thereinto. As the heated air enters through the ports 50 it is directed toward the center of the chamber 38 by baffle plates 54 secured to the inner surfaces of the partition walls 14 just above the ports 50. The flow of air through the ports 50 is controlled by dampers 51 slidably mounted against the partitions 14 and extending forwardly through slots in the front walls 13 of the container 2, so that they can be grasped and operated. The dampers 51 have ports 53 which register with the ports 50 when the dampers 51 are adjusted inwardly.

60 designates a plurality of vertically-disposed trays arranged within the chamber 38 to which access is had as hereinbefore stated through the door 11, which is hollow as shown by Fig. 3, to retain the heat within the chamber 38. Said door 11 has windows 64 through which the action of the heated air on the contents of the chamber 38 may be observed. The door 11 is also provided with instruments 66 and 68 to indicate the temperature and humidity, respectively, within the chamber 38.

Each tray 60 consists, preferably, of a rectangular frame 70, and wire mesh 72 to permit the heated air to come directly into contact with the produce held between said trays 60, which are arranged in pairs as disclosed by Fig. 2, each pair being held together by clips 74 slipped over the tops and bottoms of the frames 70. The pairs of trays 60 are rockingly mounted at their lower sides upon flanges 76 fixed to the front and rear walls 13 and 15, respectively.

The pairs of trays 60 are held in spaced relation to each other by bars 78 projecting through slots in one of the partition walls 14 and the adjacent side wall 18 of the container 2, so that they may be operated without opening the door 11 and cooling off the chamber 38. The bars 78 have notches 79 for engaging over the tops and bottoms of each pair of trays 60 and each has three notches 80 adapted to engage over the lower edge of the associate slot 82 in the wall 18. When the central notches 80 are hooked over the lower edges of the slots 82 it indicates that the trays 60 are in vertical position. When it is desired to incline the trays 60 either to the right or left as indicated by the dotted lines, Fig. 2, the top bar 78 is adjusted inwardly or outwardly as the case may be, and if further inclination of the trays is desired the lower bar 78 is adjusted, in a reverse direction to its companion. By thus being able to incline the trays 60 to one side or the other better control of the ascending currents of heated air is had as it may be caused to impinge with greater intensity against one side of the produce than the other and insure thorough drying of said produce. The inner portion of the lower bar 78 is supported in engagement with the bottom of the lower trays 60 by a rod 84 extending through the portion of the chamber 38 and supported by the front and rear walls 13 and 15, respectively, of the container 2.

Flow of the heated air through the chamber 38 is accelerated by the partial vacuum created by the exhaust of the products of combustion through the stack 8, which draws the heated air through an opening 86 in the upper portion of said chamber 38. In order to prevent all of the hot air circulating upwardly through the chamber 38 from being drawn to the center thereof through the opening 86, perforations 88 are provided in the partition walls 16 to draw a portion of the heated air therefrom.

After the produce has been satisfactorily dried the loaded trays 60 are removed from the chamber 38 through the door 11. If desired the trays 60 may be horizontally disposed one above the other within the chamber 38, the partition walls 14 being provided with superimposed supports 90, Figs. 2 and 5, to support the individual trays.

The apparatus may be made any desired size and of any suitable material and as many trays employed as may be found desirable within the capacity of the chamber 38.

From the foregoing description it will be understood that I have provided an efficient dehydrating apparatus embodying the advantages above pointed out, and while I have shown and described the perferred form of the invention, I reserve the right to make such changes in the construction, combination and arrangement of parts as properly fall within the spirit and scope of the appended claims.

Having thus described my invention, what I claim and desire to secure by Letters Patent, is:

1. In an apparatus of the character described, a vertically disposed container, means for gaining access thereto, a hot air duct projecting into said container from its bottom portion, and branch ducts in the lower portion of the container leading from said hot air duct to the outer atmosphere.

2. In an apparatus of the character described, a vertically disposed container, and two perforated superimposed false bottoms in the lower portion of said container spaced above its main bottom.

3. In an apparatus of the character described, a vertically disposed container, means for gaining access thereto, a hot air duct projecting into said container from its bottom portion, branch ducts in the lower portion of the container communicating with said hot air duct and the outer atmosphere, and trays arranged in the container above said ducts.

4. In an apparatus of the character described, a vertically disposed container, means for gaining access thereto, a hot air duct projecting into said container from its bottom portion, branch ducts in the lower portion of the container communicating with said hot air duct and the outer atmosphere, trays arranged in the container above said ducts, and an exhaust stack at the top of the container for exhausting heated air therefrom.

5. In an apparatus of the character described, a vertically disposed container, two perforated superimposed false bottoms in the lower portion of said container spaced above its main bottom, trays arranged in the container above said false bottoms, and controllable means for exhausting heated air from the top of the container.

6. In an apparatus of the character described, a container, means for gaining access thereto, a hot air duct projecting into said container from its bottom portion, branch ducts in the lower portion of the container communicating with said hot air duct and the outer atmosphere, and controllable means for admitting fresh air to the container and adjacent to said ducts.

7. In an apparatus of the character described, a container, means for gaining access thereto, a hot air duct projecting into said container from its bottom portion, branch ducts in the lower portion of the container communicating with said hot air duct and the outer atmosphere, controllable means for admitting fresh air to the container and adjacent to said ducts, deflectors above said controllable means and arranged within the container, and an exhaust stack at the upper portion of the container.

8. In an apparatus of the character described, a container, two perforated superimposed false bottoms in the lower portion of said container spaced above its main bottom, and deflectors interposed between said false bottoms.

9. In an apparatus of the character described, a container, hot air flues communicating at their lower ends with the outer atmosphere and discharging into the upper portion of said container to create a suction therethrough, and exhaust means coacting with said flues in creating a suction in the container.

10. In an apparatus of the character described, a container, hot air flues communicating with the lower portion of the container and discharging into the upper portion of said container to create a suction therethrough, dampers in the upper portions of said flues to regulate the flow of heated air therefrom into the lower portion of the container, and exhaust means coacting with said flues in creating a suction in the container.

11. In an apparatus of the character described, a container, a door thereto, a hot air duct communicating at its lower end with the outer atmosphere and discharging into the upper portion of said container to create a suction therein, controllable exhaust means at the upper portion of the container to coact with the flues in creating a suction in the container, and trays arranged within said container for holding products to be dried.

12. In an apparatus of the character described, a container, hot air flues communicating with the lower portion of the container and discharging into the upper portion of said container to create a suction therethrough, dampers in the upper portions of said flues to regulate the flow of heated air therefrom into the lower portion of the container, deflectors disposed immediately above the points of communication between the flues and the lower portion of the container, and exhaust means coacting with said flues in creating a suction in the container.

13. In an apparatus of the character described, a container, a door thereto, vertically dosposed trays spaced apart within said container, and means for tipping said trays to an oblique position.

14. In an apparatus of the character described, a container, means for gaining access to said container, trays vertically disposed within the container, and manually operably means controllable from the exterior of the container for adjusting the trays to an oblique angle.

In testimony whereof I affix my signature, in the presence of two witnesses.

WILLIAM STRICKER.

Witnesses:
L. J. FISCHER,
F. C. FISCHER.